United States Patent [19]

Sellner et al.

[11] Patent Number: 4,571,796
[45] Date of Patent: Feb. 25, 1986

[54] LATHE

[75] Inventors: Jörg Sellner, Linz; Rudolf Siegwart, Leonding, both of Austria; Siegfried Grauli, Gemmingen, Fed. Rep. of Germany

[73] Assignee: Voest-Alpine Aktiengesellschaft, Linz, Austria

[21] Appl. No.: 674,686

[22] Filed: Nov. 26, 1984

[30] Foreign Application Priority Data

Dec. 1, 1983 [AT] Austria ................. 4192/83

[51] Int. Cl.⁴ .................. B23B 7/14; B23B 11/00; B23Q 3/157
[52] U.S. Cl. ........................ 29/27 R; 29/568; 82/2 R
[58] Field of Search ............. 29/568, 27 R, 27 A, 29/27 C, 39, 36, 50; 82/25, 2 D, 2 R, 2 B

[56] References Cited

U.S. PATENT DOCUMENTS

| Re. 29,694 | 7/1978 | Foll et al. | 29/39 |
| 3,821,844 | 7/1974 | Harman et al. | 29/568 |
| 4,250,776 | 2/1981 | Morgan | 82/2 D |
| 4,506,569 | 3/1985 | Brown et al. | 82/2 R |

FOREIGN PATENT DOCUMENTS

| 353819 | 5/1922 | Fed. Rep. of Germany | 29/27 R |
| 6936306 | 6/1971 | France | 29/27 R |
| 1222165 | 2/1971 | United Kingdom | 29/27 R |
| 2082484 | 3/1982 | United Kingdom | 29/568 |
| 596379 | 3/1978 | U.S.S.R. | 82/2 D |

*Primary Examiner*—William R. Briggs
*Attorney, Agent, or Firm*—Kurt Kelman

[57] ABSTRACT

Two juxtaposed cross slides provided with toolholders are slidably mounted on the saddle of a lathe. To permit an unrestricted use of lathe tools as well as of boring, drilling and milling tools, each cross slide is movable independently of the other. One of the two cross slides carries a turret on the side which is remote from the other cross slide. Said other cross slide carries a tool head, which comprises a tool spindle, which is adapted to be rotationally driven. That tool head is mounted for angular adjustment on an axis which is at right angles to the tool spindle, to the main axis of the lathe, and to the guide for said other cross slide.

3 Claims, 4 Drawing Figures

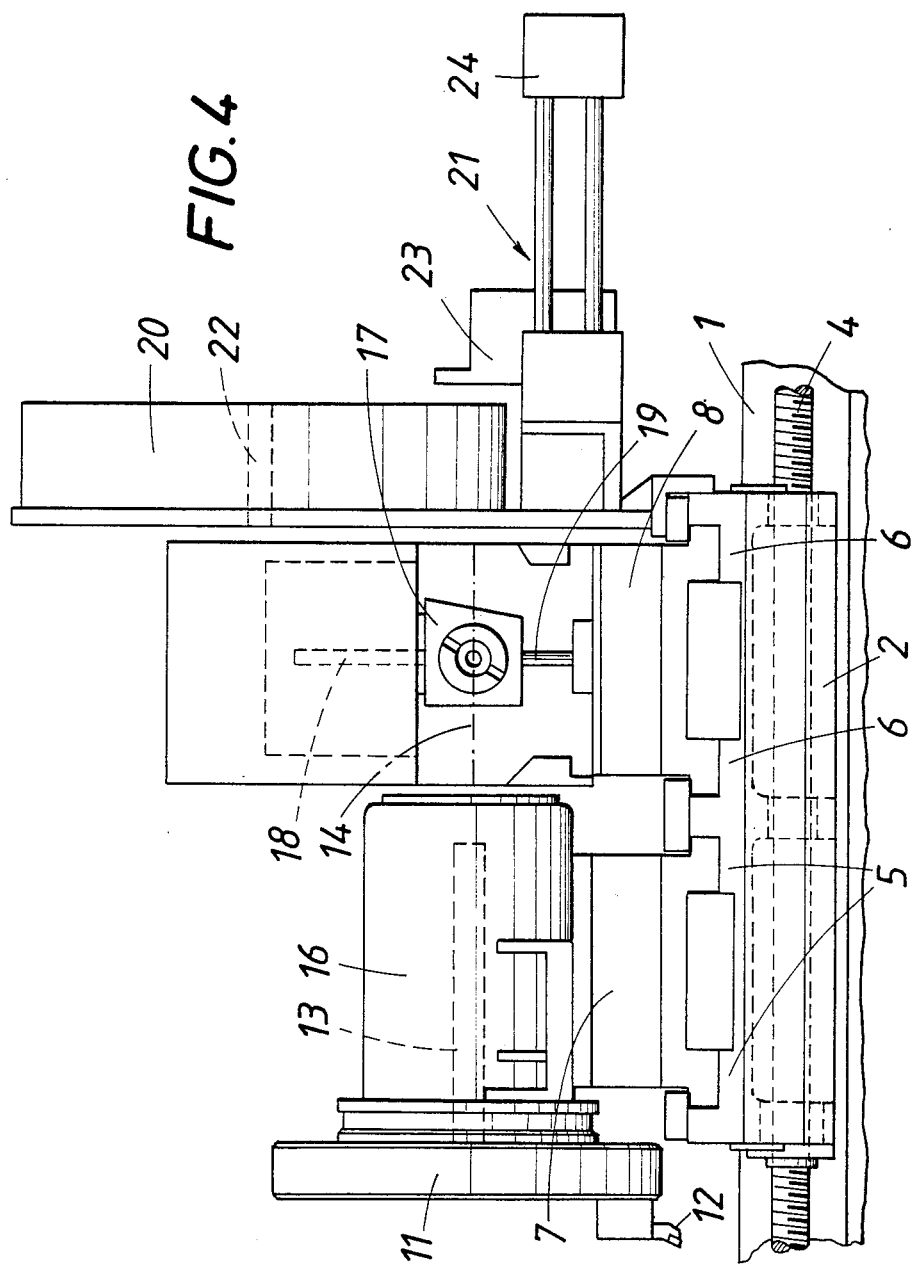

LATHE

BACKGROUND OF THE INVENTION

1. Field of the Invention

This invention relates to a lathe comprising a saddle, which is movable along a line which is parallel to a main axis that is defined by the headstock and the tailstock, and two juxtaposed cross slides, which are provided with toolholders and are slidably mounted on the saddle.

2. Description of the Prior Art

To permit the use of lathe tools as well as of boring, drilling and milling tools for machining a workpiece without a need for rechucking the workpiece, it is known to mount on a saddle of a lathe a turret, which is movable by a cross slide into engagement with the workpiece and which carries a tool head provided with a tool spindle, which in the operating position of the tool head is adapted to be coupled to a drive that is mounted on the cross slide. A boring or drilling or milling tool gripped by the toolholder of the tool head may also be used to machine a workpiece which has been chucked in the lathe. In that case, the orientation of the tool will be determined by its position relative to the turret so that separate tool heads are required for a machining in the direction of the main axis defined by the headstock and the tailstock and for a machining at right angles to that main axis. This requirement involves a considerable expenditure. Besides, the mounting of the tool heads for the milling, boring and drilling tools on a turret involves difficulties as regards an adequate support of the tool and as regards the ensuring of a machining to close tolerances. Moreover, the turret may interfere with the use of the boring, drilling and milling tools if the workpiece or the tailstock restricts the movement to be performed by the turret in order to engage the tool with the workpiece.

In an attempt to avoid said disadvantages a lathe has been proposed in which one tool head is provided with a tool spindle for carrying a boring or drilling or milling tool and with a toolholder for a lathe tool. Because the axes of the toolholders for the boring or drilling and milling tool, on the one hand, and for the lathe tool, on the other hand, are at right angles to each other and the tool head is pivoted to the cross slide carrying the tool head on an axis which bisects the angle between the axes of the toolholders and is inclined 45° from the main axis of the lathe, the axes of the tool holder can selectively be adjusted to be parallel and at right angles to the main axis by a rotation of the tool head so that the range of the machining operations which can be performed is correspondingly increased. On the other hand, no tool magazine for changing tools is available near the machining station so that the down times for a change of tools are considerably increased, even if a suitable tool-changing device is provided on the side of the lathe. This long down time is due to the fact that the saddle carrying the tool head must be moved out of the machining station to the tool-changing device.

It is also known from German Patent Specification No. 353,819 to mount two cross slides on the saddle of a lathe and to provide a drive by which the two cross slides can be moved only equal amounts in opposite directions. That adjustment by equal amount in opposite directions involves such a great restriction of the free space which is available for moving the tool into engagement with the workpiece that an efficient use of lathe tools, on the one hand, and of milling, boring and drilling tools, on the other hand, is not possible.

SUMMARY OF THE INVENTION

It is an object of the invention to avoid the disadvantages mentioned above and to provide a lathe in which lathe tools as well as boring, drilling and milling tools can be employed for a wide range of machining operations and in which a tool change can be performed without a need for a long down time.

In a lathe of the kind described first hereinbefore, that object is accomplished in accordance with the invention in that each of the two cross slides is movable independently of the other and is movable out of the range of the headstock and of the tailstock, one of the two cross slides carries on its side facing away from the other cross slide a turret, which is rotatable on an axis that is parallel to the main axis, and the other cross slide carries on its end portion facing the main axis a tool head having a tool spindle, which is adapted to be driven, and said tool head is mounted for angular adjustment about an axis which is at right angles to the tool spindle, to the main axis and to the guide for the cross slide.

Because two cross slides are provided, which are adjustable independently of each other, that cross slide which is being used at a time can always be adjusted freely between the headstock and the tailstock and such adjustment will not be restricted by the other cross slide, which is then at rest because the latter cross slide can be moved beyond the headstock or the tailstock. Because the lathe tools are carried by a turret, they can be changed quickly and regardless of the driving conditions of the milling or drilling or boring tool. The tool head which carries the boring or drilling or milling tool and is provided with the drivable tool spindle is mounted on a separate cross slide so that optimum conditions can be maintained for the use of a boring or drilling or milling tools. Because the tool head is pivoted on an axis which is at right angles to the main axis, to the guide for the cross slide and to the tool spindle, the boring, drilling and milling tools can be universally used and the axes about which an adjustment is possible provide for a large freedom of movement of the tool into engagement with the workpiece.

An additional adjustment will be possible if the tool head is mounted on the cross slide for a displacement in the direction of the pivotal axis of the tool head.

The boring, drilling and milling tools can also be changed quickly if a tool magazine provided with a tool-changing device is associated with the cross slide provided at its end with the tool head and said magazine is movable in unison with the saddle. In that case it is no longer necessary to move the saddle out of the machining station when a tool change is to be performed so that the down times involved in such movement will be avoided. Because the tool head is pivoted on an axis which is at right angles to the main axis and to the tool spindle, the latter may extend parallel to the main axis so that a tool change does not require an additional rotation of the tool to ensure that it will be inserted in the proper position into the toolholder of the tool head. The tool magazine may consist of a drum or disc having an axis of rotation which is parallel to the main axis. A gripping arm may be used to transport the tool between the tool head and the tool magazine.

BRIEF DESCRIPTION OF THE DRAWING

FIG. 4 is a side elevation showing on a larger scale the saddle, which carries the two cross slides.

DETAILED DESCRIPTION OF THE PREFERRED EMBODIMENT

Figure 1:
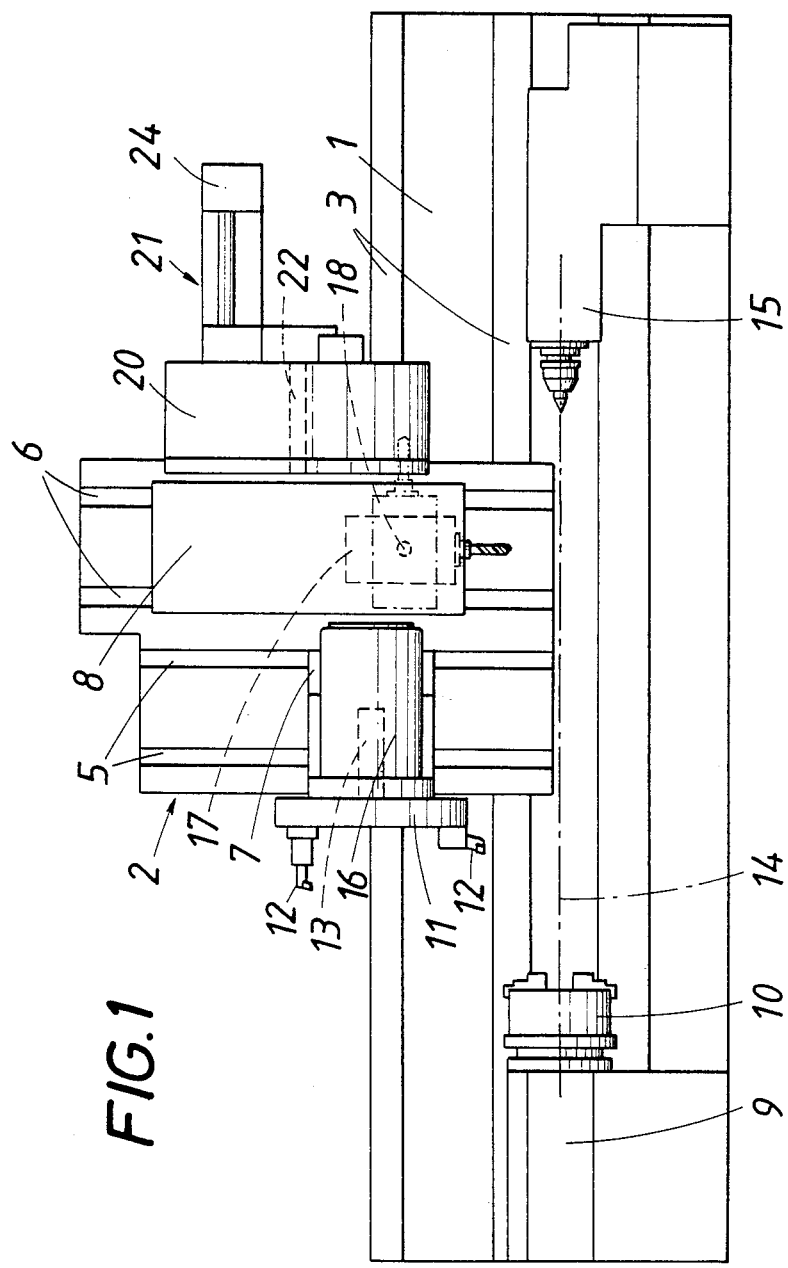
FIG. 1 is a diagrammatic top plan view showing a lathe in accordance with the invention in a view taken on the inclined bed of the lathe.

The invention is shown by way of example on the drawing.

The illustrated lathe comprises in usual manner an inclined bed 1, which has a flat guide 3, on which a saddle 2 is slidably mounted. The saddle 2 is adapted to be driven by a screw 4 (FIG. 4). The saddle 2 is provided with two guides 5 and 6, which extend at right angles to the flat guide 3 and guide respective cross slides 7 and 8, which are adjustable by means of respective screws, which are not shown for the sake of clarity. The cross slide 7 is provided adjacent to the headstock 9, which carries a chuck 9. That cross slide 7 carries a turret 11, which is provided with lathe tools 12 and is rotatable on an axis 13, which is parallel to the main axis 14 defined by the headstock 9, particularly the chuck 10, and the tailstock 15. A quick change of tools is permitted in that a suitable angular adjustment is imparted to the turret by a drive 16.

The other cross slide 8 is disposed adjacent to the tailstock 15 and near its end facing the main axis 14 carries a tool head 17, which is provided with a driven tool spindle so that a workpiece can be machined with lathe tools as well as with a boring or drilling or milling tool without a rechucking of the workpiece. The arrangement is such that the tool head 17 is mounted to be angularly adjustable about a pivotal axis 18, which is at right angles to the tool spindle, to the main axis 14 and to the guide 6 for the cross slide 8. As a result, the tool head can be pivotally moved from the position shown in FIG. 1, in which the tool spindle is at right angles to the main axis 14, to either side to a position in which the tool spindle is parallel to the main axis 14 or to any intermediate position so that the boring, drilling and milling tools can be universally employed.

In addition to its angular adjustment around the axis 18, the tool head 17 may be displaced along the pivotal axis 18 by a power screw 19. This feature permits a readjustment of the tool, e.g., when a wear of the tool is to be compensated.

Because the tool head 17 is angularly movable about the pivotal axis 18, the tool head 17 can be coupled to a tool-changing device 21, which is coupled to a tool magazine 20. For this purpose the tool magazine 20 is mounted on the saddle 2 for rotation about an axis 22, which is parallel to the main axis 14, and the saddle 2 carries also the tool-changing device 21. The latter comprises a double gripper 23, which is pivotally movable about an axis that is parallel to the main axis 14, and can be displaced by a positioning drive 24 in the direction of its pivotal axis. Owing to this arrangement a tool can be taken from the tool magazine 20 and supplied to the tool head 17 when the latter is in the proper angular position, and this operation can be performed in a simple manner. The double gripper 23 can then be used to remove in the same operation the boring or drilling or milling tool which has been inserted into the tool head.

Figure 2:
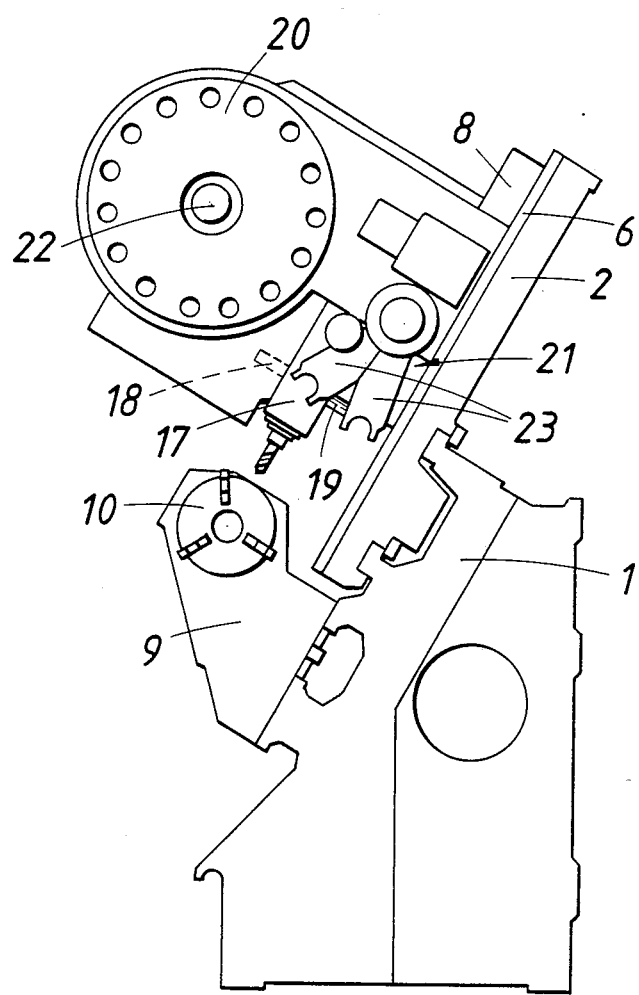
FIG. 2 is an end elevation showing that lathe in a view taken in the direction toward the headstock with the tailstock removed.
Figure 3:
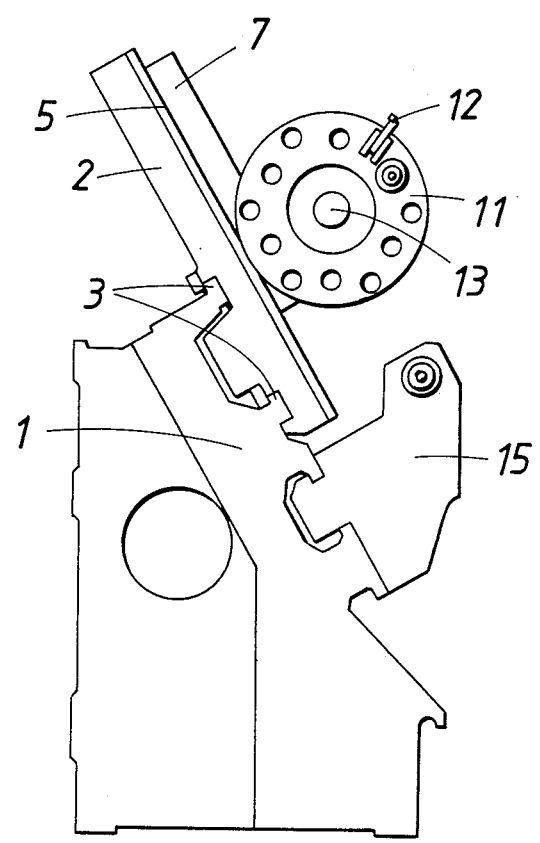
FIG. 3 is an end elevation showing the lathe in a view taken in the direction toward the tailstock with the headstock removed.

As is particularly apparent from FIGS. 1 to 3, the two cross slides 7 and 8 can be displaced on the associated guides 5 and 6 to such a distance from the main axis 14 that the saddle 2 can be moved past the headstock 9 and past the tailstock 15 without restrictions. This arrangement ensures that the boring or drilling or milling tool can be moved as far as to the chuck 10 of the headstock 9 on one side and a lathe tool 12 can be moved as far as to the tailstock 15 on the other side although the cross slide 7 is disposed between the headstock 9 and the cross slide 8 provided with the tool head 17 and the cross slide 8 is disposed between the tailstock 15 and the cross slide 7 provided with the turret 11.

We claim:

1. In a lathe comprising
   a bed,
   a headstock and a tailstock mounted on and spaced apart along said bed and defining a main axis extending along said bed,
   a saddle mounted on said bed and movable along said main axis past said headstock and past said tailstock and provided with first and second transverse guides spaced apart along said main axis and extending in a transverse direction at right angles to said main axis,
   first and second cross slides mounted on said saddle and spaced apart along said main axis and in contact with and movable along siad first and second guides, respectively, and
   first and second toolholding means carried by said first and second cross-slides, respectively, wherein said first cross slide is nearer to said headstock than said second cross slide and the latter is nearer to said tailstock than said first cross slide and each of said cross slides has an inner end portion facing said main axis,
   the improvement residing in that
   each of said cross slides is movable independently of the other in said transverse direction away from said main axis to an outer end position,
   one of said first and second toolholding means comprise a turret mounted on that side of one of said cross slides which is remote from the other of said cross slides,
   said turret is mounted on said one cross slide for rotation on an axis that is parallel to said main axis,
   the other of said first and second tool-holding means comprise a tool head mounted on said inner end portion of the other of said cross slides for angular adjustment about a pivotal axis that is at right angles to said main axis and said transverse direction,
   said tool head comprises a tool spindle which extends at right angles to said pivotal axis and is adapted to be rotationally driven,
   said first cross slide in its said outer end position is movable together with said first toolholding means by said saddle along said main axis past said headstock, and
   said second cross slide in its said outer end position is movable together with said second toolholding means by said saddle along said main axis past said tailstock.

2. The improvement set forth in claim 1, wherein said tool head is mounted on said inner end portion of said other cross slide so as to be displaceable relative to said other cross slide in the direction of said pivotal axis.

3. The improvement set forth in claim 1, wherein
- a tool magazine is provided on that side of said other cross slide which is remote from said one cross slide
- a tool magazine is mounted on said saddle on that side of said other cross slide which is remote from said one cross slide and
- a tool-changing device is mounted on said saddle between said magazine and said other cross slide and adapted to transfer tools between said tool magazine and said headstock.

* * * * *